3,174,870
FOAMED CELLULAR BODY AND METHOD OF PRODUCTION
John H. Connelly, Horseheads, and Roy V. Harrington, Corning, N.Y., assignors to Corning Glass Works, Corning, N.Y., a corporation of New York
No Drawing. Filed Dec. 26, 1961, Ser. No. 162,199
11 Claims. (Cl. 106—40)

This invention relates to foamed cellular refractory bodies produced directly from natural materials without a separate premelting operation. It is particularly concerned with an improved method of foaming or cellulating fusible, glassy and crystalline, alkaline-alumina-silicate natural materials that are characterized by viscosities of at least $10^5$ poises at 1050° C. and not over $10^7$ poises at 1500° C., a liquidus viscosity greater than $10^5$ poises and a liquidus temperature below an effective cellulation temperature within the range 1050–1500° C.

Foamed or cellulated refractory bodies, that is inorganic heat resistant bodies expanded by the internal development of non-connecting gas filled cells while the material is in a coalesced or fused state, are well known. Foamed glass products, having densities on the order of 0.15 to 0.30 gram/cc., have been in use for several years to provide buoyancy, light weight and/or thermal insulation in conjunction with resistance to heat and moisture penetration.

Such commercial products are customarily produced from premelted glass. In general, the process involves premelting a suitable glass composition, pulverizing the glass in admixture with reactable, gas producing agents (a carbon reducing agent in conjunction with an oxidizing agent incorporated either in the glass or in the batch as a further additive), depositing a thin layer of the pulverized mixture in a closed pan, heating to a foaming temperature of about 800–900° C., and then annealing over a period of several hours. The products and the process of production are technically satisfactory, but high production costs have imposed limits on areas of utility for these foamed glass products. Major economic factors are glass batch cost, separate melting and foaming operations, and mold equipment.

It has long been recognized that direct foaming of either a natural raw material or a waste slag material should provide a distinct economic advantage. Accordingly, numerous methods of foaming molten slag materials have been proposed. However, these have not been commercially adopted, except in the production of light weight aggregate for concrete mixtures. There appears to be a basic difficulty in obtaining uniform and adequate cellulation of slag material as it is obtained in the molten state.

It has been proposed, e.g., in United States Patents No. 2,485,724 and No. 2,611,712, to directly foam either unmelted glass batch or natural minerals. Such direct foaming would avoid the premelting step. In spite of the readily apparent economic advantage, these proposals have not been commercially adopted. It has proven difficult to uniformly cellulate unmelted glass batch, due to occurrence of batch reactions and/or segregation during the foaming process. Use of a natural mineral can obviate these problems, but requires cellulating temperatures on the order of 200–500° C. higher. At such temperatures, carbon reducing agents, conventionally employed to foam premelted glass, do not provide adequate cellulation.

It has therefore been proposed to add fluxes to the natural minerals and glasses in sufficient amount to attain foaming temperatures and viscosities approximating the commercial, premelted glasses, that is around 900° C. However, such flux additions minimize the economic advantage. They also tend to involve separate chemical reactions and other problems encountered with unmelted glass batch. Thus, the apparent economic advantage of natural materials in the formation of cellulated products has not been achieved due to the need for a successful method of cellulation.

It is a primary purpose of the present invention to meet this need by providing an improved method of foaming natural materials that minimizes prior problems. Another purpose is to provide an inexpensive method of producing light weight, cellulated bodies. A further purpose is to provide a light weight, cellulated natural material having low heat conductivity.

The invention is based on a discovery that certain alkaline-alumina-silicate natural materials, including rocks, minerals and natural glasses, can be successfully foamed by a proper selection and combination of raw materials, foaming agents and foaming conditions. In accordance with this discovery, a light weight cellulated material may be produced without the use of expensive flux additives, although additives are not precluded. It has further been found that the foaming process may be conducted without using closed containers or molds. This further simplifies the process, renders it more flexible and economical, and provides large integral products of particular utility in structural applications. Various additional advantages and purposes of the present invention will become apparent from the following specific description thereof.

Based on these discoveries, the present invention is an improved method of producing a foamed cellular refractory body from fusible, glassy and crystalline, alkaline-alumina-silicate natural materials, characterized by viscosities of at least $10^5$ poises at 1050° C. and not over $10^7$ poises at 1500° C., a liquidus viscosity greater than $10^5$ poises and a liquidus temperature below an effective cellulation temperature within the range 1050–1500° C., which comprises intimately mixing such a material with chemically reactable foaming agents that are essentially oxygen stable below 1050° C. and react to produce a foam while the material is within a viscosity range of about $10^7$ to $10^5$ poises, depositing a layer of the mixture on a refractory bed, cellulating this layer by heating to a cellulating temperature such that the viscosity of the material is between $10^5$ and $10^7$ poises and holding at such temperature for a time not over 16 hours to produce a desired degree of cellulation and thereafter cooling and annealing the cellulated mass. To attain uniform cellulation and a low density product, the cellulating schedule is preferably such that the mixture is brought to a uniform temperature below the cellulating temperature, heated slowly to a cellulating temperature such that the viscosity of the material is between $10^5$ and $10^7$ poises, and held at such temperature for a time varying from less than one-half hour at a viscosity of $10^5$ poises to about 16 hours at $10^7$ poises. The invention further resides in the resulting cellulated product having a low thermal conductivity due to the presence of high molecular weight gases, particularly sulfur dioxide gas, in the cells of the body.

Experience has shown that, for successful cellulation or foaming, a material should coalesce or fuse to a pasty viscous mass having a viscosity of about $10^5$ to $10^7$ poises. The difficulties encountered in foaming unmelted glass batches indicate that the material should be of a simple crystalline or natural glass type that does not involve significant decomposition or other chemical reaction as it softens to such viscosity. It is generally impractical to operate commercial kilns and the like above 1500° C. Accordingly, the material should attain a viscosity of $10^7$ poises below that temperature.

A cellulated product need not be completely glassy, but may contain a limited amount of crystalline material suspended or dispersed in a glassy matrix. However, any substantial amount of crystalline material present during the cellulation process will hinder proper cell development. Accordingly, the liquidus temperature should be below the cellulating or foaming temperature, except for a situation where a natural glass crystallizes very slowly below the liquidus. The liquidus is the temperature at which crystal phases disappear in a material during heating or reappear during cooling. The corresponding liquidus viscosity of the material should be greater than $10^5$ poises, and preferably greater than $10^6$ poises, in order to provide flexibility in the selection of cellulation viscosity and temperature. The primary consideration is to avoid the presence of a substantial amount of crystalline material during cellulation.

Natural alkaline-alumina-silicate materials, composed essentially of $Na_2O$ and/or $K_2O$, $Al_2O_3$ and $SiO_2$, generally meet these qualifications and are well adapted to the formation of cellulated refractory bodies in accordance with this invention. These materials are characterized by a viscosity of at least $10^5$ poises at 1050° C. In general the alkaline earth- and lithia-alumina-silicates have too high a liquidus temperature, or conversely, too low a liquidus viscosity to permit proper foaming. However, the presence of minor amounts of these silicates may be tolerated in some instances.

The felspar type minerals, individually or in combination as in granite rocks, are particularly desirable because of their suitable properties and their ready availability at low cost. In general, these materials soften to the proper viscosity for cellulation at temperatures of about 1100–1300° C. In addition, various natural glasses such as obsidian, pumice, pearlite and pitchstone have been successfully foamed in accordance with the present improved method.

A particular feature of the present method is the combination of gas producing or foaming agents, that is the agents which chemically react to provide the requisite gas for foaming. To be suitable, these reactants must be stable and relatively unreactive at temperatures below the cellulating range, that is at temperatures below that at which the material being cellulated attains a viscosity of about $10^7$ poises. Within the cellulation range, that is within the temperature range of 1050° C.–1500° C. and corresponding to viscosities of $10^7$ to $10^5$ poises, the materials should react relatively rapidly.

The various forms of carbon and carbonaceous materials conventionally employed as a reducing reactant have been found to be unsuitable because of a tendency to burn out, or otherwise become ineffective, at temperatures above about 900° C. In accordance with the present invention, a reducing agent that is essentially oxygen stable to a temperature of about 1100° C. is employed in conjunction with an alkaline sulfate as an oxidizing agent. Reducing agents found to have the requisite stability are finely divided metals, metal carbides and metal sulfides. The preferred agents, in each group respectively, are aluminum (Al), silicon carbide (SiC) and iron sulfide (FeS). Any of the alkali metal or alkaline earth sulfates may be employed as the oxidizing agent. However, sodium sulfate ($Na_2SO_4$) is preferred because it has proven particularly effective and is economical.

The density of the cellulated product will depend, among other factors, on the amount of gas-producing agents available to react. In general, at least 0.2% SiC, or an equivalent amount of other reducing agent, and 0.5% $Na_2SO_4$, or an equivalent amount of other alkaline sulfate, is required to provide a density of 0.15–0.30 gram/cc. in a product cellulated under optimum conditions. However, it is usually desirable to employ about 0.5% SiC and 1.25% $Na_2SO_4$ to reduce cellulation time and also provide a margin of safety. Larger amounts, e.g., 1.5% SiC and 4% $Na_2SO_4$, may be employed but are generally unnecessary and uneconomical. Also, excess amounts may result in rapid, voluminous foaming that is difficult to control. An amount of either reactant below the indicated minimum will normally result in a higher density product.

Reference to other reactants in an amount equivalent to SiC or $Na_2SO_4$ is on the basis of mole percent in any given batch. It means that any substituted reactant will be present in that mole percent capable of providing an equal volume of gaseous reaction product in accordance with the reactions postulated subsequently. For example, one mole percent FeS and two mole percent Al would be equivalent to one mole percent SiC on the basis of such reactions. In terms of weight percent, 0.2% by weight SiC would correspond to about 0.4% by weight FeS or 0.5% by weight Al. Correspondingly, about 0.8% by weight barium sulphate ($BaSO_4$) would correspond to 0.5% by weight $Na_2SO_4$.

The present process renders flux additives unnecessary for cellulation purposes. However, additives need not be excluded, except as they introduce chemical reactions that interfere with gas formation and foaming. Thus, calcium oxide or $MgO$-$CaO$-$Al_2O_3$-$SiO_2$ slag commercially available under the trademark "Calumite," may be added for durability purposes. Small amounts of silica may be added to lower the thermal expansion coefficient of the product.

In practicing the invention, the natural alkaline-alumina-silicate material is mixed with the foaming agent additives and finely ground, as by ball milling, to provide an intimate mixture. This facilitates uniform cellulation. The mixture is then spread over a refractory surface in a thin layer of uniform thickness. This may be a conventional metal pan of either open or closed type where a molded body is desired.

For larger bodies as well as for economy, a further feature of the invention resides in depositing the layer over a sand or other refractory bed and cellulating without lateral restraint or confining members. In this manner, slabs as wide as firing chamber facilities permit, e.g., 3 x 5 feet cellulated panels, may be produced. It has been found that, while some rounding of the edges occurs during firing, flatness of the upper surface actually improves in such larger bodies cellulated by the present method. The cellulated body may therefore be trimmed to a rectangular panel with but small loss. Of major significance is the elimination of costly pans or other molds. As a convenience, it may be desirable in some cases to provide removable mold walls as the pulverized layer is deposited on its refractory bed.

The thin layer of material, e.g., one to two inches thick, is subjected to a controlled heat treatment that sinters and softens the material to an essentially molten state and thermally induces the gasifying or foaming reaction. This thermal treatment may be carried out either batch style in a kiln, or in a continuous fashion in an elongated heating unit in the nature of a lehr. In the gasifying process, the metal, carbide or sulfide reducing agent reacts with the alkaline sulfate oxidizing agent to produce quantities of gaseous products. These are retained within the body of the material in the form of gas cells thereby effecting the desired expansion of the material.

The controlled heating schedule may be considered as consisting of five separate steps. First, the material is heated at any convenient rate to a hold temperature slightly below that at which the foaming reaction, that is the chemical reaction between the reducing agent and sulfate, rapidly occurs. For feldspar type materials, about 1050° C. is a convenient hold temperature. The hold time is sufficient to permit attaining a uniform temperature throughout the batch. For a two inch thick batch a period of about one hour is usually sufficient. Longer times are undesirable because they may result in excessive deterioration or loss of the gasifying agents.

The batch is then heated slowly to a cellulating temperature at which it is essentially vitrified or free of crystal-line phases and has a viscosity within the range of $10^5$ to $10^7$ poises. The rate of heating will be slower as the thickness of the batch increases with a rate of about 2° C. per minute being proper for a batch two inches in thickness. If the batch is heated to the maximum cellulation temperature, that is a temperature at which it has a viscosity of about $10^5$ poises, no sustained hold time is required before cooling. In any event, it should not be held at such temperature over about one-half hour since an undue loss of gas, in essence fining of the mass, may occur. On the other hand, if the maximum temperature is equivalent to $10^7$ poises viscosity, the material should be held at that temperature for a period of time on the order of about 16 hours. It has been found that most satisfactory foaming occurs at temperatures equivalent to about $10^6$ poises viscosity. The cellulating material should be held at such intermediate cellulation temperature for a period of about one to two hours.

It will be appreciated that these conditions are prescribed for optimum cellulation, that is a minimum density on the order of 0.15 to 0.30 gram/cc. If a higher density material is desired, for example for strength, the time and temperature conditions of cellulation may be lowered slightly. The degree of cellulation may also be restricted by employing lesser amounts of foaming agents, or a combination of such controls.

When a satisfactory degree of foaming has been achieved as described above, the foamed material is then cooled rapidly to the annealing temperature and thereafter annealed in accordance with known cellular glass practice.

An optimum degree of foaming or cellulation requires that the reaction of the gasifying materials must be closely correlated with the maximum foaming temperature in order to ensure both proper cell formation and gas retention in the material. It is highly desirable to employ a reaction which occurs at a temperature equivalent to a viscosity of about $10^6$ poises so that the foaming temperature can be reasonably high and thereby keep the total temperature cycle relatively short. For the feldspar type materials, this temperature is about 1250° C., and the only satisfactory gasifying reaction found thus far is that of an alkaline sulfate with one of the indicated reducing agents. The metals and metal sulfides are preferred inasmuch as they tend to produce, except for trapped air, essentially sulfur dioxide gas in the cells, this gas being of a high molecular weight so that the thermal conductivity of the material is relatively low.

In contrast, the conventional carbon reduction reaction in premelted glass cellulation at 800–900°C. normally results in appreciable amounts of higher conductivity gases such as $H_2$ and CO.

When closed pan firing is employed, there is little opportunity to exert external control on the gasifying process. However, with the preferred type of uncontained firing on a sand bed, it has been found that oxygen or air enrichment of the atmosphere is necessary where the foaming chamber is gas fired. In the absence of excess air or other source of oxygen enrichment, alkaline sulfates tend to decompose at low temperatures, thereby removing an essential ingredient of the foaming reaction. In addition to sulfate retention, the presence of excess oxygen is also highly desirable to minimize production of low molecular weight gases, such as carbon monoxide, during cellulation.

The theoretical reactions desired are:

$$SiC + MSO_4 + 1\tfrac{1}{2}O_2 = SiO_2 + CO_2 + SO_2 + MO$$
$$4Al + 2MSO_4 + 2O_2 = 2Al_2O_3 + 2SO_2 + 2MO$$
$$FeS + MSO_4 + O_2 = FeO + 2SO_2 + MO$$

By way of more specifically describing the invention reference is made to the following specific examples:

Example 1

A quantity of a granite rock, containing potassium feldspar and analyzing approximately 4% $Na_2O$, 4% $K_2O$, 14% $Al_2O_3$ and the remainder essentially $SiO_2$, was mixed with 1.5% sodium sulfate and 0.5% silicon carbide. The mixture was ground to a fineness of about −400 mesh and then filled to a depth of about 1 inch in a refractory metal pan. The material was then heated at normal furnace rate in a gas fired kiln wherein the normal 10 to 1 air-gas burner mixture was altered to provide about 20% excess air. The kiln was heated to a temperature of about 1050° C., held at this temperature for about 1 hour and then heated to a temperature of about 1240° C. at a rate of about 2° C. per minute. The material was held at the maximum temperature of 1240° C. for about 1 hour and then cooled over a period of several hours. The resulting cellulated product had a relatively uniform cell size, a density of about 0.2 gram per cc. and a gas analysis, on a mol percent basis showed approximately 50% $CO_2$ 30% $SO_2$ and 20% air residue in the cells.

Example 2

A cellulating batch was prepared from Buckingham feldspar, a material having the following approximate analysis:

| | |
|---|---:|
| $SiO_2$ | 66.5 |
| $Na_2O$ | 3.7 |
| $K_2O$ | 10.5 |
| CaO | 0.5 |
| $Al_2O_3$ | 18.8 |

The batch consisted of 181.5 parts by weight of the feldspar, 2.5 parts $Na_2SO_4$ and 1 part silicon carbide. It was ball milled for 16 hours to provide an intimate, finely divided mixture.

The milled mixture was then evenly spread over the bottom of a rectangular pan to a depth of about three-quarter inch and placed in a gas-fired kiln at 900° C. The kiln was heated to 1040° C. at a rate of 6° C. per minute, held at that temperature for one hour to attain thermal equilibrium, then heated at a rate of 2° C. per minute to 1240° C. The batch was held at 1240° C. for 1½ hours to permit cellulation, then cooled rapidly to about 900° C. and thereafter cooled in accordance with foamed glass annealing practice.

The foamed product had a density of 0.43 gram/cc. This density could be reduced to about 0.30 by using longer ball milling times.

The advantage of avoiding batch reactions, other than the desired cellulation reaction, may be seen from a test made with a batch formulated to produce an identical fused composition from ordinary glass batch components. This batch in parts by weight was:

| | |
|---|---:|
| Pulverized sand | 120.8 |
| Sodium carbonate | 11.6 |
| Potassium carbonate | 28.3 |
| Calcium carbonate | 1.6 |
| Calcined alumina | 34.2 |
| | 196.5 = 181.6 glass. |

The batch was mixed with 2.5 parts $Na_2SO_4$ and one part silicon carbide and milled in manner identical with that employed for the feldspar batch.

The material was then handled and fired in manner identical with that employed for the feldspar material. The resulting product had a density of 1.09 grams/cc. as compared to 0.43 for the feldspar batch. By optimizing milling and other conditions that brought the feldspar density down to about 0.3, the density for the above batch was reduced to about 0.9, the adverse density ratio thus being about 3:1.

What is claimed is:
1. An improved method of producing a foamed cellular refractory body from fusible, glassy and crystalline, alkaline-alumina-silicate natural materials that are characterized by viscosities of at least $10^5$ poises at 1050° C. and not over $10^7$ poises at 1500° C., a liquidus viscosity greater than $10^5$ poises and a liquidus temperature below an effective cellulation temperature within the range 1050–1500° C., which comprises
  intimately mixing such a natural material with chemically reactable foaming agents that are essentially oxygen stable below 1050° C. and react to produce a foam while the material is within a viscosity range of about $10^7$ to about $10^5$ poises,
  depositing a layer of the mixture on a refractory bed,
  cellulating this layer by heating to a cellulating temperature such that the viscosity of the material is between $10^5$ and $10^7$ poises and holding at such temperature for a time not over 16 hours to produce a desired degree of cellulation, and
  cooling and annealing the cellulated mass.

2. An improved method of producing a foamed cellular refractory body, having a high degree of cellulation and low density, from fusible, glassy and crystalline, alkaline-alumina-silicate natural materials that are characterized by viscosities of at least $10^5$ poises at 1050° C. and not over $10^7$ poises at 1500° C., a liquidus viscosity greater than $10^5$ poises and a liquidus temperature below the effective cellulation temperature within the range 1050–1500° C., which comprises
  intimately mixing such a natural material with chemically reactable foaming agents that are essentially oxygen stable below 1050° C. and react to produce a foam while the material is within a viscosity range of about $10^7$ to about $10^5$ poises,
  depositing a layer of the mixture on a refractory bed,
  bringing this layer to a uniform temperature below the foaming temperature,
  heating slowly to a cellulating temperature such that the viscosity of the material is between $10^5$ and $10^7$ poises,
  holding at such temperature for a time varying from less than one-half hour at a viscosity of $10^5$ poises to about 16 hours at a viscosity of $10^7$ poises, and
  cooling and annealing the cellulated mass.

3. A method in accordance with claim 2 wherein the foaming agents include, as an oxidizing agent, an alkaline sulfate in amount equivalent to 0.5–4% $Na_2SO_4$.

4. A method in accordance with claim 2 wherein the foaming agents include, as a reducing agent, a finely divided metal in amount equivalent to 0.2–1.5% silicon carbide.

5. A method in accordance with claim 2 wherein the foaming agents include, as a reducing agent, a metal carbide in amount equivalent to 0.2–1.5% silicon carbide.

6. A method in accordance with claim 2 wherein the foaming agents include, as a reducing agent, a metal sulfide in amount equivalent to 0.2–1.5% silicon carbide.

7. A method in accordance with claim 2 wherein the fusible natural material is of a feldspar type.

8. A method in accordance with claim 2 wherein the fusible natural material is a granite.

9. A method in accordance with claim 2 wherein the material is thermally treated in a gas fired furnace in which the atmosphere is oxygen enriched to prevent sulfate loss during initial heating and insure production of oxidized gases during gasification.

10. A method in accordance with claim 2 wherein the material is rapidly heated to a temperature of about 1050° C. and held at that temperature for a sufficient time to attain equilibrium temperature throughout the mass.

11. A method in accordance with claim 2 wherein the maximum temperature of the heat treatment cycle is that at which the material has a viscosity of about $10^6$ poises and wherein the material is held at that temperature for a period of one to two hours to permit foaming.

References Cited by the Examiner
UNITED STATES PATENTS

| | | | |
|---|---|---|---|
| 1,877,138 | 9/92 | Lee et al. | 25—156 |
| 1,917,112 | 7/33 | Guastavino | 106—40 |
| 2,123,536 | 7/38 | Long | 106—40 |
| 2,306,330 | 12/42 | Dewey | 106—40 |
| 2,485,724 | 10/49 | Ford | 106—40 |
| 2,596,669 | 5/52 | Ford | 106—40 |
| 2,611,712 | 9/52 | Ford | 106—40 |
| 2,706,844 | 4/55 | Nicholson | 106—40 |
| 2,758,937 | 8/56 | Ford | 106—40 |
| 2,890,126 | 6/59 | Ford | 106—40 |
| 3,050,812 | 8/62 | Felder | 264—43 |

OTHER REFERENCES

Hamlin et al.: publication pub. March 20, 1951, 644 O.G., p. 914.

TOBIAS E. LEVOW, *Primary Examiner.*